US012567012B2

(12) United States Patent
Joyner

(10) Patent No.: US 12,567,012 B2
(45) Date of Patent: Mar. 3, 2026

(54) METHOD FOR CLOUD COMPUTING GENERAL CONTRACTOR TO SUBCONTRACTOR NETWORKING AUTOMATION

(71) Applicant: Megabit, LLC, Hockessin, DE (US)

(72) Inventor: James D. Joyner, St. Louis, MO (US)

( * ) Notice: Subject to any disclaimer, the term of this patent is extended or adjusted under 35 U.S.C. 154(b) by 210 days.

(21) Appl. No.: 17/988,726

(22) Filed: Nov. 16, 2022

(65) Prior Publication Data

US 2023/0153713 A1     May 18, 2023

Related U.S. Application Data

(60) Provisional application No. 63/279,840, filed on Nov. 16, 2021.

(51) Int. Cl.
*G06Q 10/0631*          (2023.01)
(52) U.S. Cl.
CPC ................ *G06Q 10/063112* (2013.01); *G06Q 10/063114* (2013.01)
(58) Field of Classification Search
CPC .......................................... G06Q 10/00–50/00
USPC ............................................... 705/7.11–7.42
See application file for complete search history.

(56) References Cited

U.S. PATENT DOCUMENTS

| | | | | |
|---|---|---|---|---|
| 6,728,686 B2* | 4/2004 | Kasai | .................. | G06Q 20/105 |
| | | | | 705/40 |
| 7,333,996 B2* | 2/2008 | Berry | .................... | G06Q 30/06 |
| | | | | 707/999.002 |

| | | | | |
|---|---|---|---|---|
| 10,600,105 B1* | 3/2020 | Kumar | ............... | G06Q 30/0637 |
| 2001/0033768 A1* | 10/2001 | Mochizuki | .............. | B42F 7/025 |
| | | | | 402/79 |
| 2002/0087332 A1* | 7/2002 | Como | .................... | G06Q 10/06 |
| | | | | 705/1.1 |
| 2003/0028408 A1* | 2/2003 | RuDusky | ............... | G06Q 30/02 |
| | | | | 705/37 |

(Continued)

OTHER PUBLICATIONS

Mordor Intelligence, Contract Lifecycle Management Software Market Size, Share & Forecast Report 2030, Dec. 2024, Hyderabad, India, www.mordorintelligence.com/in.

(Continued)

*Primary Examiner* — Alan S Miller
(74) *Attorney, Agent, or Firm* — Charles McCloskey

(57)          ABSTRACT

The collection and submission of data elements from an individual occurs at registration for a new account or updating an existing account upon cloud-based software to accept service leads and service job offers from general contractors. This method allows applying for, automatically processing, and providing management of the associations, arrangements, agreements, interactions, and transactions between general contractors, subcontractors, and customers to convert service leads to jobs on cloud-based software. The method processes the service lead data from external systems and reads the relationship with the service lead details and general contractors and subcontractors. This method creates service job terms and conditions and tracks the job status against them. It communicates job status to the users and then accepts payment for the service job. Then, the method disburses payments to general contractors and subcontractors accordingly. The method continues communications between its users regarding additional jobs.

4 Claims, 3 Drawing Sheets

(56)         References Cited

U.S. PATENT DOCUMENTS

2003/0055769 A1* 3/2003 RuDusky ............... G06Q 30/02
                                                  705/37
2003/0225683 A1* 12/2003 Hill ....................... G06Q 10/06
                                                  705/37
2005/0289051 A1* 12/2005 Allin ...................... G06Q 10/00
                                                  705/40
2007/0239512 A1* 10/2007 Scott ............. G06Q 10/063112
                                                  705/7.14
2009/0307046 A1* 12/2009 Taylor ................... G06Q 20/14
                                                  705/40
2014/0040077 A1* 2/2014 Livesay ................ G06Q 40/00
                                                  705/26.82
2014/0297468 A1* 10/2014 Patterson ........... G06Q 30/0609
                                                  705/26.35
2017/0140323 A1* 5/2017 Laird ............. G06Q 10/063112
2017/0186075 A1* 6/2017 Husser ............... G06Q 30/0635
2019/0026820 A1* 1/2019 Adolphe ......... G06Q 10/06393
2020/0242174 A1* 7/2020 Biran ................... G06F 16/953
2021/0166172 A1* 6/2021 Royce ............. G06Q 10/06311
2022/0012658 A1* 1/2022 Vierra ............. G06Q 10/06312
2022/0058583 A1* 2/2022 Thompson ......... G06Q 30/0214

OTHER PUBLICATIONS

James D. Joyner, Curriculum Vitae, Sep. 5, 2025, p. 1, v. 1, St. Louis, MO, USA.

Rabbet, 2024 Construction Payments Report, 2024, Rabbet Inc., Austin, TX, USA, rabbet.com/reports/construction-payments-2024.
American Express, Solving Construction's Delayed Payments With Digital Tools, Jan. 2025, American Express, New York, NY USA, www.americanexpress.com/content/dam/amex/.
PYMNTS, From the Ground Up: Rebuilding Payments in the Construction Industry, Jan. 2024, PYMNTS, Boston, MA, USA, www.pymnts.com/tracker_posts/from-the-ground-up-rebuilding.
Horne, Horne Construction Industry Outlook 2025, Dec. 2024, Horne, Ridgeland, MS, USA, horne.com/construction-industry-wrap-up-2024-challenges-2025-outlook/.
Arcoro, Arcoro Construction Workforce Challenges 2025, Dec. 2024, Scottsdale, AZ, USA, arcoro.com/resources/guides/2025s-top-construction-workforce-challenges.
ABC Greater Tennessee, Construction Labor Shortage: Challenges, Impacts, and Solutions, Jan. 2025, Knoxville, TN, USA, abctn.org/construction-labor-shortage.
Fortune, Construction Software Market Size, Share, Aug. 2025, New York, NY USA, www.fortunebusinessinsights.com/construction-software-market-110155.
Verdantix, Contractor Management Software Market Set to Exceed $4 Billion by the End of 2028, Dec. 2023, London, UK, verdantix.com/insights/blogs/contractor-management-softwar.
Grand View Research,Contract Management Software Market Size Report, 2030, Dec. 2024, www.grandviewresearch.com/industry-analysis/contract-managementsoftware-mark.

* cited by examiner

Figure 1.1:
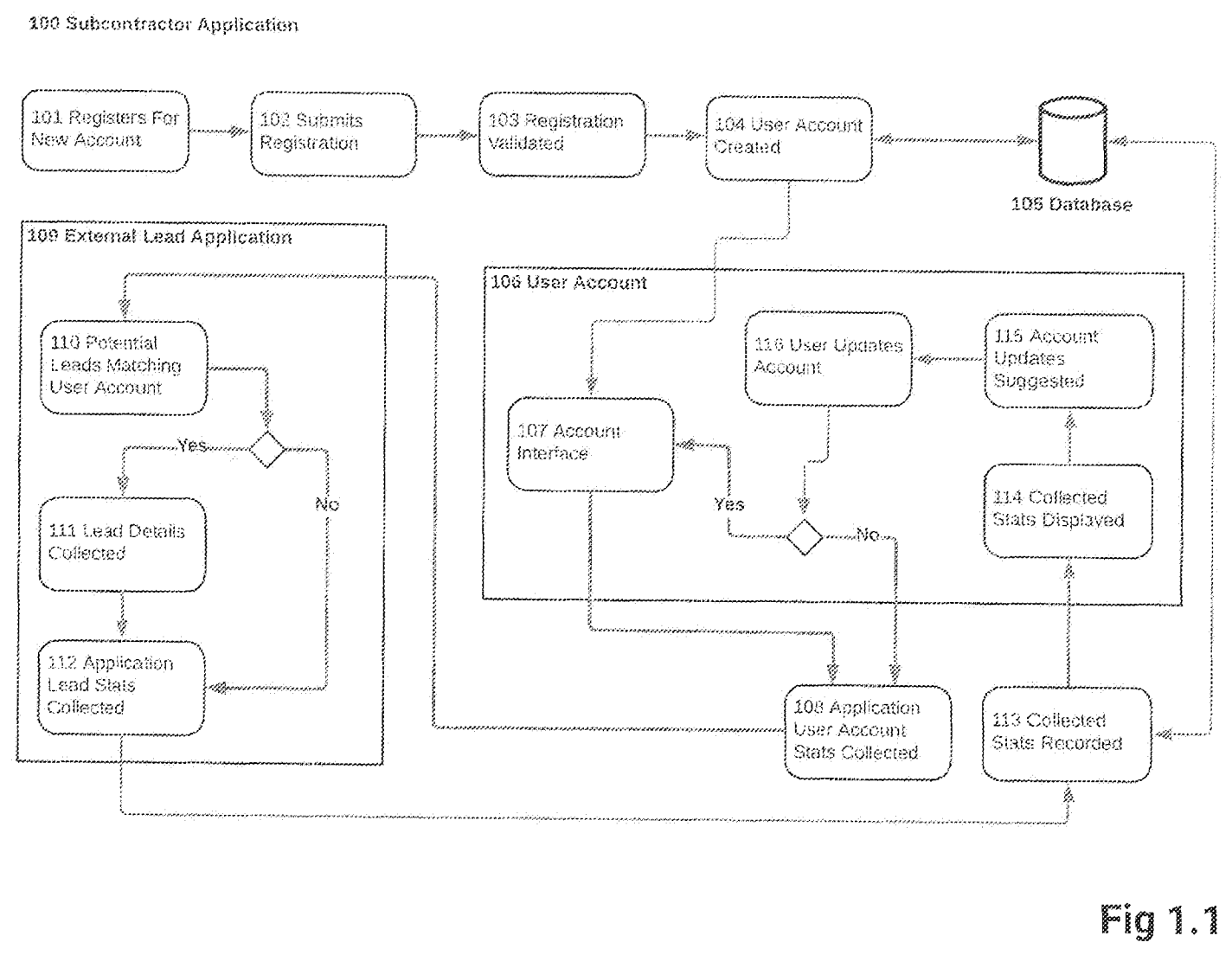

Figure 2.1:
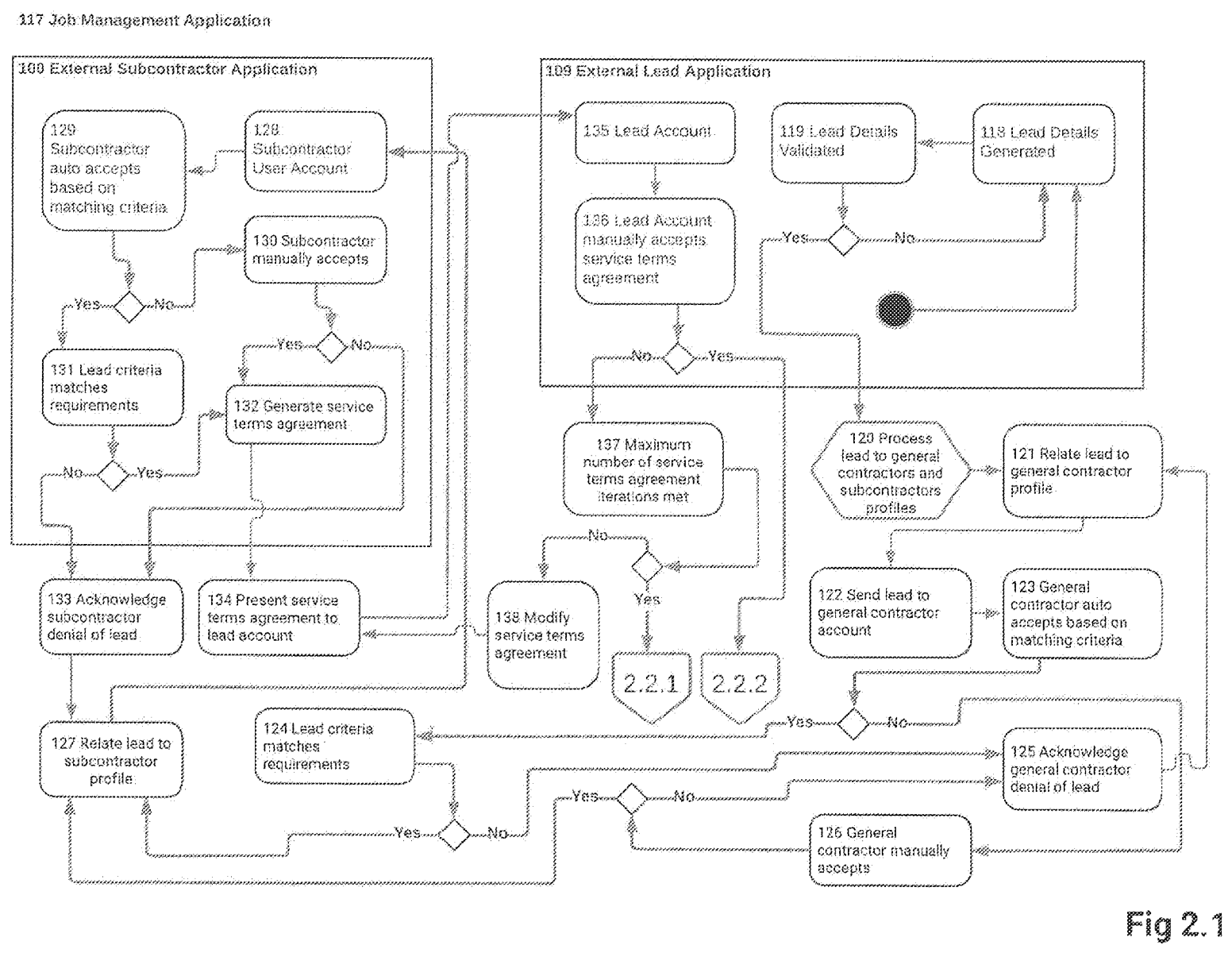

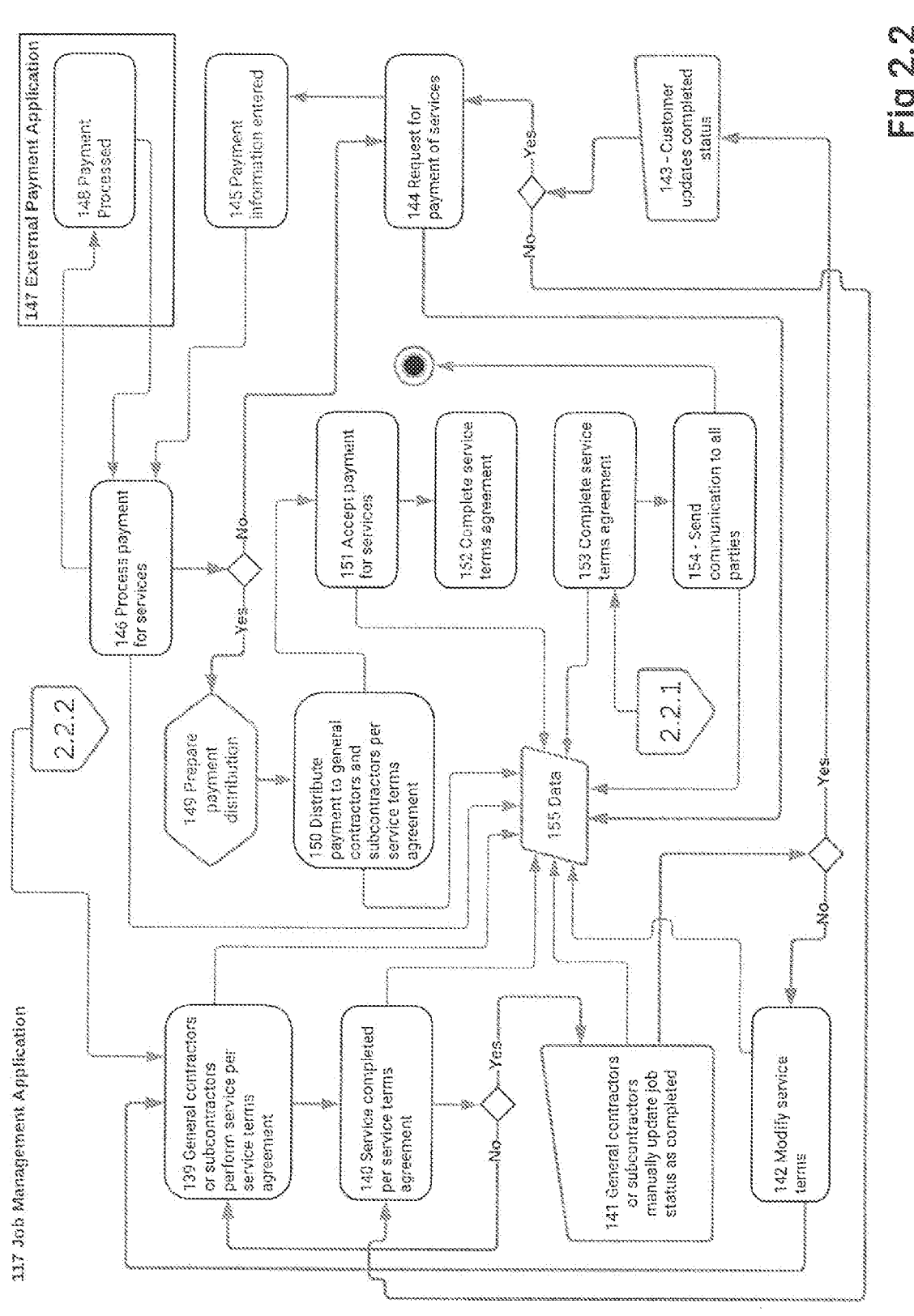
Fig 2.2

METHOD FOR CLOUD COMPUTING GENERAL CONTRACTOR TO SUBCONTRACTOR NETWORKING AUTOMATION

CROSS-REFERENCE TO RELATED APPLICATION

This non provisional application claims priority to provisional application Ser. No. 63/279,840 filed on Nov. 16, 2021 which has a common inventor.

BACKGROUND OF THE INVENTION

The present invention relates to a software method of cloud computing where a user registers as a general contractor or a subcontractor and the software automatically manages the associations, arrangements, agreements, interactions, and transactions between general contractors, subcontractors, and customers to convert service leads to jobs.

DESCRIPTION OF PRIOR ART

Existing software manages relationships between contractors, subcontractors, or customers by a manual entry form within a Customer Relationship Management, or similar software environment. The prior art requires the user to enter and maintain the data manually. In addition, the prior art does not retrieve incoming service lead data to automatically relate the job with general contractors. The prior art though prevents branching out, relating a lead with subcontractors as necessary for the project specifications and, eventually, the terms of the job.

SUMMARY OF THE INVENTION

For a general contractor, the present invention provides electronic management and automated computational services for subcontractor networking, payouts, assignments, and agreements. This invention guides a software user to become a general contractor for services, then creates and maintains a network of other users who opt-in as subcontractors. The invention automatically pairs a general contractor with one or more subcontractors per presented service terms and conditions within the invention. The invention's networking model provides a software user a method to become a subcontractor for a general contractor or a general contractor with management functions for one or more subcontractors per calculated service terms and specifications. In addition, this invention allows the user to be a general contractor or a subcontractor with the same software profile. This invention automates managing and assigning service requests to general contractors and subcontractors. After registering for a software account, the user provides profile details, opting in to use a general contractor or a subcontractor networking. The invention provides a general contractor with incoming service leads based on predefined categories and specifications that will then be associated with a related network of subcontractor accounts. Subcontractors create and manage their own profiles within the software of the invention. Based on subcontractor data, the software automatically associates the subcontractor within the network. Once the invention communicates service lead information to the general contractors, the software continues to assist with the conversion of the service lead to an actual service job. The invention promotes communication with subcontractors and the paying customer who submitted the request for service.

There has thus been outlined, rather broadly, the more important features of the invention in order that the detailed description thereof that follows may be better understood and in order that the present contribution to the art may be better appreciated.

This software will manage and relate the service lead details with general contractor profile details and any necessary subcontractors needed to perform the work. Once the service lead is related and provided to general contractors, the software will execute additional steps to relate, assign or recommend associated subcontractors based on their skills, availability, and other gathered information needed to perform the service job. General contractors, subcontractors, and customers with save time with this invention as this software method greatly reduces the need for manually reviewing and managing service leads, terms, subcontractor resources, and payout; using this method, with computational automation, will decrease the time to convert leads to quotes, quotes to jobs, and therefore increase the likelihood of additional revenue for general contractors, subcontractors, and create a more streamlined experience for the customers. In addition, general contractors need to address current time constraints, avoid manual work associated with managing resources, and utilize this software method to automatically match job details with subcontractors from a network of resources to accept and perform the work. Whether a service lead requires one or more, new or established subcontractors, general contractors will be able to accept additional service jobs because the software method will automatically match the service details with profiles from the associated subcontractor network.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved method for cloud computing general contractor to subcontractor networking automation that suggests subcontractors to a general contractor based on trade tasks mentioned in a contract's terms and conditions.

Still another object of the present invention is to provide a method for cloud computing general contractor to subcontractor networking automation that may be easily and efficiently manufactured and marketed to the consuming public.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 1.1 is a flow chart describing the preferred embodiment of the present invention in reference to a subcontractor;

FIG. 2.1 is a flow chart describing the preferred embodiment of the present invention in reference to a general contractor; and FIG. 2.2 is a flow chart describing the preferred embodiment of the present invention during usage with a variety of users.

The same reference numerals refer to the same parts throughout the various figures.

DESCRIPTION OF THE PREFERRED EMBODIMENT

The drawings illustrate the invention, particular implementations of processes and methods of carrying out the invention, the Method For Cloud Computing General Contractor to Subcontractor Networking Automation. In brief, FIG. 1.1, as a flow chart, describes how the subcontractor creates an account once they choose to become a subcontractor within the software and are then part of a subcontractor network. FIGS. 2.1, 2.2 are flow charts showing the software implementing automation with the general contractors, the subcontractor network, and the customers.

To begin, a user such as a subcontractor, or a general contractor, a customer, a property representative, and the like, with a computer device, securely navigates or is directed to the software on device and logs into their existing account or enters job skill profile details and background data into the account. Here security refers to the security of data by encrypting the data, message, email, text, or various forms of data from one system to another when reading, writing, viewing, processing, entering, translating, or any area of data processing using SSL, certificates, security keys, server encryption or other protocols or accessing applications, data, servers hosting or computing, and the like. Here, the account involves software application or user interaction with the customer or other software users for automatic, manual input, or processing to the application of the invention. The user agrees via data input to an interface of the invention's software application or the subject computer medium, to the terms and conditions, here shown as exemplary as the terms and conditions adjust from project to project. Then the user profile data is saved to databases or other data storage. Such databases or other data storage may take the form of structured or unstructured, document or non-document-based, distributed or non-distributed, database or system set of data on a server computer or instance of a device that serves or performs the computation of information. If the user does not agree to the details of the terms and conditions details the software of the invention will warn, through the invention's software application interface, the user and redirect back to the job skill profile details of the account. After the user has signed up and agreed to the terms and conditions or updates their existing account, with user navigation action over the internet or other method to interact with websites, applications, or other technologies, the software processes the entered and submitted user data as a function of the invention. The software then continually builds the user profile data by reading user data events, actions, behavior with external data resources such as lead sources providing inbound data for service leads. Building the user profile data has data input transmitted to a software application or the subject computer medium or database whether structured or unstructured, document or non-document-based, distributed or non-distributed database, or system set of data on a server computer or instance of a device that serves or performs the computation of information.

Moreover, the user, or subcontractor, with a computer device, securely navigates or follows directions to the software on the device and logs into theft existing account or enters job skill profile details and background data to a new account.

In the new account function, the user agrees to the terms and conditions and the invention saves the user profile data to databases or other data storage. If the user does not agree to the terms and conditions details the software application will warn the user and redirect the user back to the job skill profile details. Once a user has signed up for and agreed to the terms and conditions or updates their existing account, the software processes the entered and submitted user data. During usage, the invention as a software application continually builds the user profile data by reading user data events, actions, and behavior with external data resources.

Then the invention transitions along where external lead sources are pushed to the software application. The software application receives vetted service data. Software application processes and associates vetting service data with availability and profile data of general contractors and subcontractors. Software application provides the service lead to one or more general contractors. The general contractor user accepts the preliminary service lead and terms manually or automatically based on profile settings in the software's account. If general contractor user does not accept the lead then software application acknowledges and records a general contractor denial of the service lead and continues to offer the service lead to other users classified as general contractor. The software application then continues to match up the service lead, from external lead sources, to other users classified as general contractors. When general contractor users accept the preliminary service lead and terms manually or automatically based on profile settings in software, the software application then relates the vetting service data and associated, related subcontractors. Software application reads external subcontractor service to match service lead details with available users that are classified as subcontractor. The external subcontractor service returns a match and requests for the subcontractor user to accept the preliminary service lead and terms manually or automatically based on profile settings in the software account. If subcontractor user accepts the preliminary service lead and terms, software application generates service terms and agreement. If subcontractor user does not accept the terms and conditions then software acknowledges and records subcontractor user denial of the job with the general contractor user and continues to offer the service lead to other users classified as subcontractors. Software application then relates the vetted service data to other users classified as subcontractors. When subcontractor user accepts the service term agreement, a property representative is asked to accept the service terms agreement. If a property representative does not accept the service terms agreement, the software checks the number of times the service terms agreement has been modified then, if not the maximum number of iterations with modifications, the software modifies the service terms agreement and represents the agreement to the property representative. If the service terms agreement has been modified to the maximum number of iterations, the software then completes the service terms agreement and sends the communication to all users. If property representative accepts the service terms agreement then general contractors, or one or more subcontractors perform the service per accepted, service terms agreement. Software determines if the service has been completed per service terms agreement.

If the software determines the service has not been completed per service terms agreement then software checks that one or more general contractors or one or more subcontractors perform service per service terms agreement. The service includes physical labor, product, data, service, or other exchange for payment as services rendered. If software determines the service has been completed per service terms agreement then software requests for one or more general contractors or one or more subcontractors to manually update the service job status as completed within the software. Once the service job is marked as completed in the software the customer is requested to update the completed status. If the customer does not mark the service job as completed then the software determines if the service has been completed per service terms agreement where the software then asks the general contractors or subcontractors if the job is completed and this is where the users need to mark it as not completed. When the users mark the job as not, the software modifies service terms and one or more general contractors or one or more subcontractors perform additional service per the modified service terms. If the customer updates the service job status as completed, the software requests for payment of services. The general contractor or subcontractor enters payment information. The software processes payment for services. The software calls the external payment processing service. If the payment for services is successful, the software prepares payment distribution. If the payment for services is not successful, the software then requests for payment of services where this payment process is restarted. Once the payment is successful, the software distributes payment to one or more general contractors or subcontractors per service terms. The software then accepts payment for service when applicable. The software completes service terms agreement. The software then sends communication.

The invention has additional select functions and operations. Here, external lead sources are pushed to the software. The software application of the invention receives vetted service data. The invention's software processes and associates vetting service data with availability and profile data of general contractors and subcontractors. Then the invention's software provides a service to one or more general contractors. The general contractor user accepts the preliminary service lead and terms manually or automatically based on profile settings in the software. If the general contractor user does not accept the lead then the software acknowledges and records the general contractor denial of the service lead and continues to offer the service lead to other users classified as general contractor. The software then continues to match up the service lead, from external lead sources, to other users classified as general contractors.

When general contractor users accept the preliminary service lead and terms manually or automatically based on profile settings in the software, the invention's software then relates the vetting service data and associated, related subcontractors. Software reads external subcontractor service to match service lead details with available users that are classified as subcontractors. The subcontractor service returns a match and requests for the subcontractor user to accept the preliminary service lead and terms manually or automatically based on profile settings in the software.

If the subcontractor user accepts the preliminary service lead and terms, the invention's software generates service terms and agreement. If the subcontractor user does not accept the terms and conditions, then the software acknowledges and records the subcontractor user denial of the job with the general contractor user and continues to offer the service to other users classified as subcontractors.

Software application then relates the vetted service data to other users classified as subcontractors. When the subcontractor accepts the service term agreement, the property representative is asked to accept the service terms agreement. If the property representative does not accept the service terms agreement, the software checks the number of times the service terms agreement has been modified then, if not the maximum number of iterations with modifications, the software modifies the service terms agreement and presents again the agreement to the property representative. If the service terms agreement has been modified to the maximum number of iterations, the software then completes the service terms agreement and sends the communication to all users.

Other functions of the invention occur when the property representative accepts the service terms agreement then general contractors or one or more subcontractors perform the service per accepted, service terms agreement. The invention's software determines if the service has been completed per service terms agreement. If the software determines the service has not been completed per service terms agreement, then software one or more general contractors or one or more subcontractors perform service per service terms agreement. If software determines the service has been completed per service terms agreement, then software requests for one or more general contractors or one or more subcontractors to manually update the service job status as completed within the software. Once the service job is marked as completed in the software the customer is requested to update the completed status.

If the customer does not mark the service job as completed, then the software determines if the service has been completed per service terms agreement where the software then asks the general contractors or subcontractors if the job is completed, and this is where the users need to mark it as not completed. When the users mark the job as not completed, the software modifies service terms and one or more general contractors, or one or more subcontractors perform additional service per the modified service terms.

If the customer updates the service job status as completed, the software requests payment for services. The general contractor or subcontractor enters payment information, here or previously during its account setup. The software processes payment for services using an external payment processing service. If the payment for services is successful, the software prepares payment disbursement.

If the payment for services is not successful, the software then requests payment for services where this payment process is restarted. Once the payment is successful, the software disburses payment to one or more general contractors or subcontractors per service terms. The software then accepts payment for service when applicable. The software completes the service terms agreement. The software then sends communication.

The present invention embodied in a software application includes the following steps: registering a user, receiving data from the user, receiving a request to create and to update an account as a general contractor, a subcontractor, or a project owner, processing of service lead data from external systems, that is sources, processing and reading a relationship with the service lead details and general contractors and subcontractors, creating service job terms and conditions akin to a contract, tracking the job status against the job's terms and conditions, managing job status communication with the users, accepting payment for the service job form the project owner, disbursing payments to general contractors and subcontractors following the terms and conditions of their contracts, and communicating with general contractors, subcontractors, project owners, or customers for additional jobs.

FIG. 1.1 is a flow chart describing the preferred embodiment of the present invention with its subcontractor application 100. The subcontractor application begins with the step of initial registration of a subcontractor, or user. The user registers for a new account as at 101. In doing so, the user submits registration data, as at 102 into a screen, or an application. The invention then validates that data as at 103 and creates a user account as at 104 for the user. The invention stores the user account upon a database 105 stored electronically in physical local memory or in a remote cloud storage facility accessible by internet. With an account created, the user proceeds into the user account as at 106.

The user views an account interface as at 107 that suggests possible steps for the user to take next within the invention. A primary step collects select statistics upon the application user account as at 108. Such statistics include number of leads presented to the user, number of leads selected by the user, number of leads accepted by the source of the lead, user completion of leads, payment status to the user from completion of leads, and further statistics organic to the invention. With commencement of collection of statistics, the invention receives leads from an external lead application as at 109. The external lead application, activated from the account interface, pulls leads, such as jobs or projects from select external databases, such as Dodge plan room, Engineering News Record, and government request for bids sources. From those leads, the invention as at 110, selects potential leads that match the user's account, particularly preferences identified by the user at registration. If the potential leads match one or more preferences, the invention collects the complete details of the lead as at 111. The invention then collects lead statistics as at 112, here denoting a potentially suitable lead. However, some leads do not match any preference of the user, and when that occurs, step 110 described above proceeds directly to collecting lead statistics 112. The invention then records the collected stats as at 113 upon its database 105 as shown.

The invention then marshals the collected stats and displays them as at 114 upon the user account, particularly upon the account interface 107. If the collected statistics show a user or leads varying dramatically from the user preferences, the invention suggests account updates as at 115 for the user to consider. If the user views a suggestion positively, the user updates his account as at 116. Though this description utilizes masculine pronouns, both genders and juridical entities are implied for users. It a user disfavors a suggestion, the invention submits a statistic into the collection for the user as at 108, and returns to the interface, FIG. 2.1 is a flow chart describing the preferred embodiment of the present invention when general contractors operate it as users, as in a job management application 117. Let's return to the external lead application 109 as first described above. Within this application 109, the invention receives leads from an external source as denoted by the dark circle. The leads then flow into the lead details generated step 118. This step 118 collects data about a lead, for example, location, description of work, timing, and the like. The invention then validates the lead as at 119 where the invention checks for completeness of lead information and duplication with other leads already contained in the database 105. If the validation fails, as at no, the lead application 109 generates another lead through step 118. If the validation passes as at yet, the lead application continues to processing the lead into profiles of general contractors and subcontractors as at 120, later described.

The external lead application 109 has a lead account 135 for the user, here a general contractor. The lead account collects general contractor information selectively and certain lead information, particularly towards commercial terms. The commercial terms include service terms agreement compatible with the contractor's industry, trade, or profession. The user then uses the lead account for whether to manually accept the service terms agreement as at 136. If the user accepts the service term agreement, the invention through this figure guides the user and the reader to junction point 222 in FIG. 22 below.

If the user does not accept the service terms agreement, the invention counts the iteration of not meeting a service terms agreement. The invention the checks as at 137 whether this user's declination meets the maximum number of service terms agreement iterations. If it does meet that limit, this figure guides the user and the reader to junction point 2.2.1 in FIG. 2.2 below.

If it does not meet that limit, this description continues with the invention modifying the service terms agreement as at 138, seeking mutual consent of the user and the lead source. For finding that consent, the invention presents the service terms agreement to the lead account, as at 134, for viewing by the user. The lead account then presents the service terms agreement to a subcontractor, or other party. As described for FIG. 1 above, the invention has its external, subcontractor application 100. The subcontractor application has additional features that receive a modified service terms agreement from step 134. Step 134 sends the modified agreement to a subcontractor user account as at 128. In the subcontractor user account, this user has uploaded data about himself and about desired leads, jobs, and projects, or criteria. The invention then presents the modified agreement against the subcontractor users criteria. And the subcontractor user account automatically accepts leads, jobs, and projects that match criteria as at 129. Step 129 then displays the accepted lead for this user to view. If this user does not consent to the automatically accepted lead, this user may manually accept the lead as at 130. Then the invention generates an updated service terms agreement as at 132 and displays that agreement to the lead account as at 134.

If this user manually declines the accepted lead, the invention does not generate a modified service terms agreement. Rather the invention acknowledges the subcontractor user's denial of the lead as at 133.

Returning to step 129 as described above, if this user does consent to the automatically accepted lead, the invention determines if the lead matches the subcontractor users requirements as at 131. If the lead does match them, then the invention generates a modified service terms agreement as at 132 and the invention proceeds as described above.

If the lead does not match them, the invention again acknowledges the subcontractor user's denial of the lead as at 133.

After the invention acknowledges the denial above, it relates the lead to a subcontractor user's profile, as shown at 127, as the profile comes from the subcontractor user's account of 128.

Returning towards the right quadrant of the figure, let us seek out the processing lead, as at 120. After that processing, the invention relates the lead to the general contractor user's profile, as shown at 121, as the profile comes from the general contractor user's account 104 of FIG. 1.1. Then the invention sends the lead as at 122 for display to the general contractor user through the interface as at 107.

Then the general contractor user account automatically accepts leads, jobs, and projects that match criteria as at 123. This step 123 then displays the accepted lead for this user to view. If this user consents to the automatically accepted lead on display, this user accepts the lead as it matches lead criteria requirements as at 124. Then relates it to the subcontractor user's profile as at 127.

If this lead does not match lead criteria requirements, the invention acknowledges the general contractor user's denial of the lead as at 125. The invention then displays that denial to the general contractor as at 126. If the general contractor then manually accepts the lead, the invention sends that positive decision by relating it the subcontractor user's profile as at 127.

But if the general contractor user manually declines the lead, the invention again acknowledges the general contractor user's denial of the lead as at 125. The invention further relates the declined lead to the general contractor's profile as at 121.

FIG. 2.2 then presents a flow chart describing the preferred embodiment of the present invention during usage with general contractors, subcontractors, and customers. This flow chart illustrates the job management application 117 once more from FIG. 2.1. FIG. 2.1 mentioned a junction point at 22.1 here in the lower middle of FIG. 2.2. From the 2.2.1 junction point, the invention proceeds to note the user completing the service terms agreement as at 153. News of the service completion reaches all parties once communicated by the invention to them as at 154. After successful communication, the invention ends at the large black circle show hi the figure. Both the complete services step 153 and the send communication to all parties step 154 contribute to a collection of data 155 stored on the database 105 as described above.

Then FIG. 2.1 mentioned a junction point at 2.2.2 here in the upper middle of FIG. 2.2. From the 2.2.2 junction point, the invention advances to where the user, either a general contractor or a subcontractor perform a service per the service terms agreement as at 139. The invention then checks if the user did complete the service as at 140. If the invention determines the user did not yet complete the service, the invention returns to step 139. If the invention determines the user completed the service, the invention permits the user to manually update the job, lead, or project status as completed as at 141. Steps 139, 140, and 141 continually feed data into the collection of data 155 there on the database 105.

If a user denotes the lead as not yet complete, a user may seek to modify the service terms as at 142 of the service terms agreement previously described. Such request to modify the terms returns the user to step 139 of the invention.

If a user denotes a lead completed, the customer who initiated the lead updates the lead status to completed, as at 143. When a customer does not see the lead as actually completed, the customer directs the user, through the interface 107 and the lead account 135 to check if the service, lead, job, or project was completed per the service terms agreement, as at 140.

When a customer sees the lead, service, job, or project completed, the invention receives the user's request for payment for services as at 144. The present invention compares the user's request with the payment portion of the services agreement and requests the customer to enter payment information as at 145. With that information entered into the invention, the invention processes payment for services as at 146 utilizing an external payment application as at 147. This external payment application the processed the payment as at 148 and returns either an approval code and funds into the user's account or a denial code and no funds move. If a denial code appears, the processes payment step 146 sends a message to the user to request payment again via step 144.

When an approval code appears, the invention prepares payment distribution as at 149 as in marshaling funds from the customer. With the funds collected, the invention then distributes payment to the users, such as general contractors and subcontractors following the service terms agreement as at 150. The payment processing of 146 and the payment distribution of 150 also continually feed data 165 into the database 105.

Overall, this invention as a software method, automatically matches general contractors with subcontractors based on job details, contractor profile information, such as skills, and availability of subcontractors. This process of matching these parties together is dynamic because it happens in real time as job requests are entered into the system. This method will streamline the laborious process of finding worker resources to complete job requests by automatically integrating with the home owner (external lead application), the subcontractor (external subcontractor application), and with the general contractor (manager on the job management application). This invention will provide general contractors an opportunity to save time and take jobs that they normally would need to turn down because they do not have the workforce to handle fluctuations in work. This also allows subcontractors to make more money with a greater consistency of work.

While a preferred embodiment of the Method for Cloud Computing General Contractor to Subcontractor Networking Automation has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following Maims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A computer-implemented method for real-time contractor networking automation in cloud computing environments, said method comprising:

receiving contractor registration data including technical skill profiles, geographic availability zones, and real-time location determination capabilities, said receiving contractor registration data utilizing a cloud-based processing system utilizing computer device communication capabilities;

processing real-time job requests from property owners including specific job site coordinates, required technical skills, and completion timeline parameters, said processing real-time job requests utilizing said cloud-based processing system using communication facilities over interconnected networks using standardized protocols;

executing automated contractor matching algorithms, said executing automated contractor matching algorithms utilizing said cloud-based processing system automatically and programmatically, wherein said executing automated contractor matching algorithms calculate real-time distance metrics between contractor current locations and job site coordinates using computer device location capabilities, apply weighted scoring algorithms to contractor skill profiles against job requirements, and generate ranked contractor availability lists based on real-time location data and current job status;

generating service agreements with dynamic payment terms determined by real-time job completion verification and automated quality assessment metrics, said generating service agreements utilizing said cloud-based processing system automatically and programmatically;

monitoring contractor performance continuously, said monitoring contractor performance utilizing said cloud-based processing system having real-time data integration through communication facilities, wherein said monitoring contractor performance provides location-verified job site presence and duration tracking using computer device capabilities, automated quality assessment based on completion time metrics and property owner feedback, and real-time performance scoring using weighted algorithmic analysis;

processing payment distribution upon verified job completion, said processing payment distribution occurring automatically, said processing payment distribution utilizing said cloud-based processing system having automatic and programmatic processing, wherein said processing payment distribution provides location-confirmed job site completion verification using computer device capabilities, automated quality threshold validation, and real-time payment release; and maintaining real-time contractor network coordination through dynamic resource allocation algorithms that optimize contractor utilization across multiple simultaneous job assignments, said maintaining real-time contractor network coordination utilizing said cloud-based processing system using communication facilities and standardized protocols as originally disclosed.

2. The computer-implemented method for real-time contractor networking automation in cloud computing environments of claim 1 further comprising:

said executing automated contractor matching algorithms having real-time location-based calculations utilizing computer device capabilities that determine contractor availability based on current location coordinates and predefined service radius parameters, dynamic scheduling algorithms that process contractor current job status, estimated completion times, and travel time calculations through automatic, programmatic processing to optimize job assignment sequences, and predictive availability algorithms that forecast contractor capacity based on historical performance data and current workload analysis.

3. A computer-implemented method for real-time contractor networking automation in cloud computing environments, said method comprising:

receiving contractor registration data including technical skill profiles, geographic availability zones, and real-time location determination capabilities, said receiving contractor registration data utilizing a cloud-based processing system utilizing computer device communication capabilities;

processing real-time job requests from property owners including specific job site coordinates, required technical skills, and completion timeline parameters, said processing real-time job requests utilizing said cloud-based processing system using communication facilities over interconnected networks using standardized protocols;

executing automated contractor matching algorithms, said executing automated contractor matching algorithms utilizing said cloud-based processing system automatically and programmatically, wherein said executing automated contractor matching algorithms calculate real-time distance metrics between contractor current locations and job site coordinates using computer device location capabilities, apply weighted scoring algorithms to contractor skill profiles against job requirements, and generate ranked contractor availability lists based on real-time location data and current job status;

generating service agreements with dynamic payment terms determined by real-time job completion verification and automated quality assessment metrics, said generating service agreements utilizing said cloud-based processing system automatically and programmatically;

monitoring contractor performance continuously, said monitoring contractor performance utilizing said cloud-based processing system having real-time data integration through communication facilities, wherein said monitoring contractor performance provides location-verified job site presence and duration tracking using computer device capabilities, automated quality assessment based on completion time metrics and property owner feedback, and real-time performance scoring using weighted algorithmic analysis;

processing payment distribution upon verified job completion, said processing payment distribution occurring automatically, said processing payment distribution utilizing said cloud-based processing system having automatic and programmatic processing, wherein said processing payment distribution provides location-confirmed job site completion verification using computer device capabilities, automated quality threshold validation, and real-time payment release;

maintaining real-time contractor network coordination through dynamic resource allocation algorithms that optimize contractor utilization across multiple simultaneous job assignments, said maintaining real-time contractor network coordination utilizing said cloud-based processing system using communication facilities and standardized protocols as originally disclosed; and said monitoring contractor performance occurring in real-time and having continuous location tracking integration utilizing computer device capabilities that automatically record job site arrival and departure times with timestamp verification, automated quality assessment algorithms that process multiple data sources including completion time analysis, property owner feedback integration, and historical performance comparison through automatically, programmatically processing as disclosed, and real-time performance alert generation using communication facilities and standardized protocols that trigger automatic notifications when performance metrics fall below predetermined quality thresholds.

4. The computer-implemented method for real-time contractor networking automation in cloud computing environments of claim 3 further comprising:

said processing payment distribution upon verified job completion having multi-factor verification algorithms that require location-confirmed job completion using computer device capabilities, automated quality assessment validation, and contractual compliance verification before payment release automatically and programmatically, real-time payment calculation algorithms that determine compensation amounts based upon job completion verification, quality assessment scores, and dynamic pricing parameters, and automated audit trail generation that maintains comprehensive records of all verification steps, quality assessments, and payment processing decisions.

* * * * *